(12) United States Patent
Wang et al.

(10) Patent No.: US 7,715,133 B2
(45) Date of Patent: May 11, 2010

(54) METHOD FOR DUPLICATING DATA

(75) Inventors: Sung-Jung Wang, Taipei County (TW);
Tai-Ching Chiu, Taipei County (TW);
Shih-Chiang Tsao, Hsinchu (TW)

(73) Assignee: An Chen Computer Co., Ltd., Banciao, Taipei County (TW)

( * ) Notice: Subject to any disclaimer, the term of this patent is extended or adjusted under 35 U.S.C. 154(b) by 978 days.

(21) Appl. No.: 11/481,050

(22) Filed: Jul. 6, 2006

(65) Prior Publication Data

US 2008/0007853 A1   Jan. 10, 2008

(51) Int. Cl.
*G11B 5/86* (2006.01)
(52) U.S. Cl. ..................................... 360/15; G9B/5.306
(58) Field of Classification Search ........................ None
See application file for complete search history.

(56) References Cited

U.S. PATENT DOCUMENTS

| 6,104,555 | A * | 8/2000 | Nam ........................... 360/15 |
| 6,591,363 | B1 * | 7/2003 | von Below ..................... 713/2 |
| 6,898,038 | B1 * | 5/2005 | Fennema et al. .............. 360/60 |

* cited by examiner

*Primary Examiner*—Daniell L Negrón
(74) *Attorney, Agent, or Firm*—Birch, Stewart, Kolasch & Birch, LLP

(57) ABSTRACT

A method of the present invention duplicates data of a source medium to target media. The source medium is stored ground data and effective data, wherein the ground data are repeated to fill up the source medium and the effective data overwrite some of the ground data. Next, reading data of the source medium and comparing the data to the ground data. If the data are not as same as the ground data, then copy the data to the at least one target medium. If the data are as same as the ground data, then read the next t data of the source medium and repeating the comparing step.

8 Claims, 4 Drawing Sheets

METHOD FOR DUPLICATING DATA

BACKGROUND OF THE INVENTION

1. Field of the Invention

The present invention relates generally to a computer peripheral device, and more particular to a method for duplicating data from a source data medium to a plurality of target media in a fast and reliable way.

2. Description of the Related Art

A simple and fast way of duplication is cloning the source medium to another medium. For a read-only media, there will not be the issue of writing datum, so that such media have the data gathering up to have all data effective for duplication.

There are random-access medium, which may read and write data, having empty regions for the data written therein latterly, so that a file may be divided into several fragments and stored in different regions of the medium. The random-access medium usually has a manage space and a data space, wherein the manage space stores the information of operating system and file system, such as partition table, active program, file allocation table (FAT) etc., and the data space stores the data of the files therein. FAT is a table recording the contents of the data in the data space, including names of the files, addresses of the data, such as cluster addresses, for the index of the files.

To duplicate a source random-access medium to another target random-access medium, the data of the manage space of the source random-access medium are copied first, and then system will read the content of FAT to copy the files in the data space in a way of file by file. As a result, the read/write heads of the source and target media reciprocate between the FAT in the manage space and the fragments of files in the data space repeatedly that slows the speed of duplication much when the files have a large number of fragments and the fragments are not centralized.

SUMMARY OF THE INVENTION

The primary objective of the present invention is to provide a method of duplicating data, which may reduce the moving time of the read/write head of the media to short the duplication time.

According to the objective of the present invention, a method for duplicating data of a source medium to at least one target medium includes the steps of:

a) Making the source medium, in which ground data and effective data are stored, wherein the ground data are repeatedly stored in the source medium, and the effective data, which are data for duplication, overwrite some of the ground data, wherein each of the overwritten ground data 12 is partially or entirely overwritten.

b) Reading data of the source medium, wherein a size of the data is as same as that of the ground data.

c) Comparing the data to the ground data. If the data are not as same as the ground data, then copy the data to the at least one target medium. If the data are as same as the ground data, then take no duplication; and d) Reading next data of the source medium and repeating the step c.

DETAILED DESCRIPTION OF THE INVENTION

Figure 1:
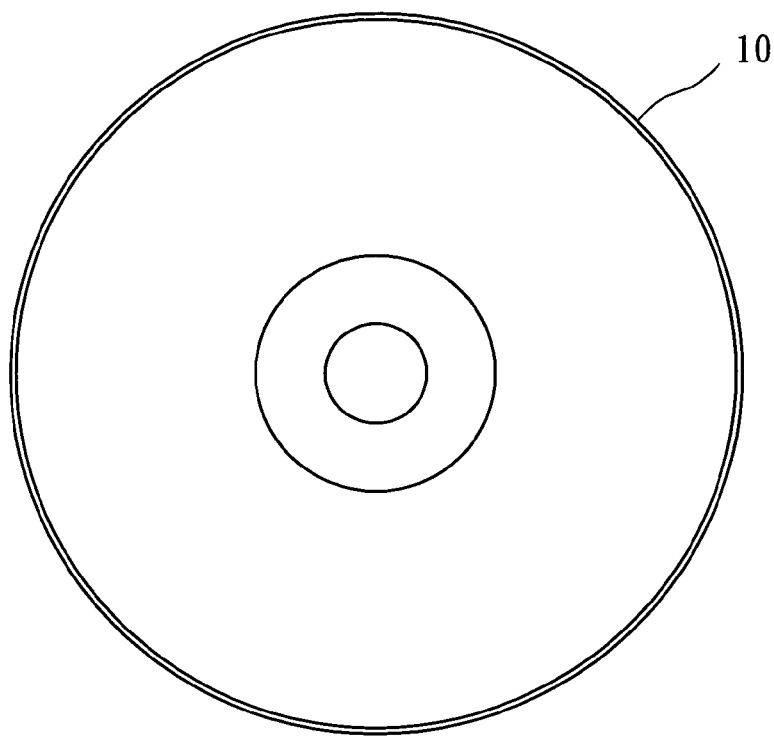
FIG. 1 is a sketch diagram of an empty compact disk.

As shown in FIG. 1, we prepare an empty storage medium 10, which is a compact disk shown in FIG. 1. The storage medium 10 may be floppy disk, hard disk, compact disk (CD), digital video disk (DVD), flash memory device, tape and other relative devices.

Figure 2:
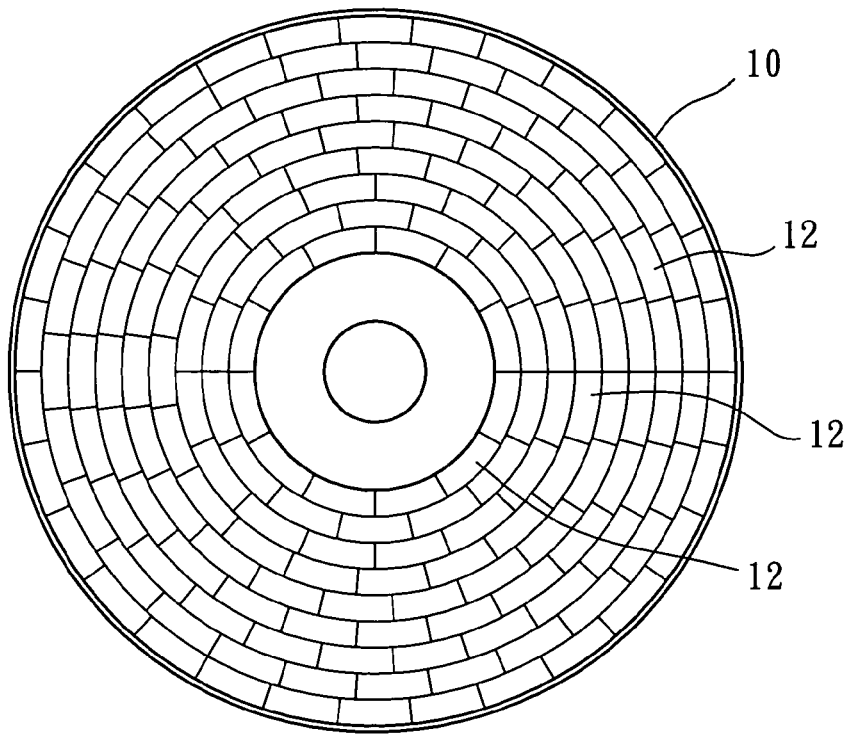
FIG. 2 shows the compact disk written with the ground data.

Writing predetermined ground data 12 the storage medium 10 repeatedly to make the storage medium 10 stored with the ground data 12 in the entire space that may store data, as shown in FIG. 2. The size of the ground data 12 may be a sector or a couple of sectors (512 bytes to 2048 bytes). The content of the ground data 12 is generated in random or choosing a rare combination by manual. The inventor suggests that the ground data 12 is generated in random, and the size is a sector.

Figure 3:
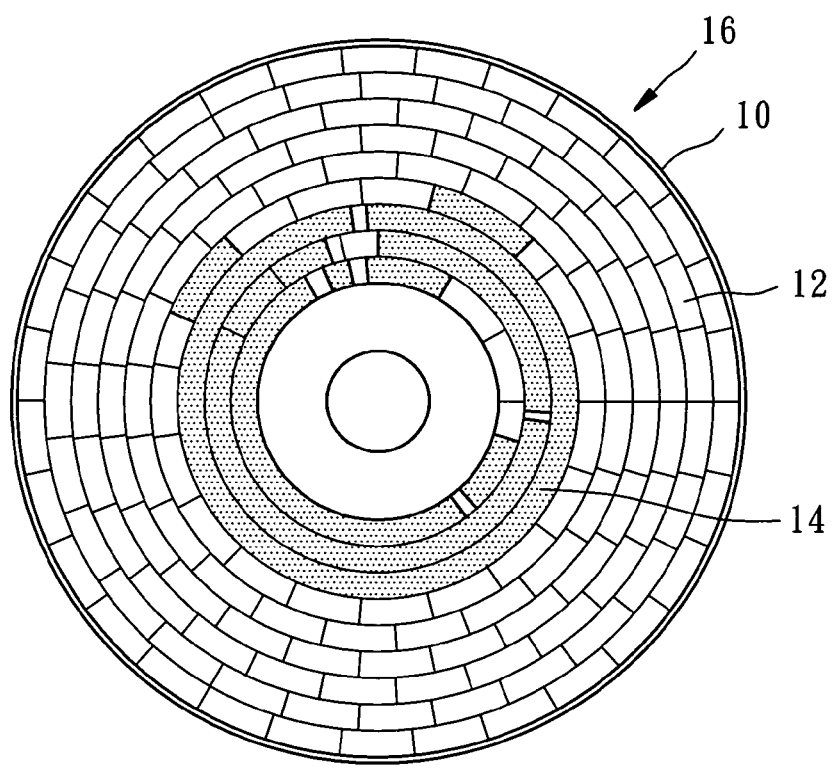
FIG. 3 shows the compact disk written with the effective data overwriting some of the ground data.

Writing effective data 14, which are the data for duplication, into the storage medium 10 to overwrite some of the ground data 12, as shown in FIG. 3. The effective data 14 may overwrite parts or entire of the ground data 12; namely, each of the overwritten ground data 12 is partially or entirely overwritten. Therefore, we will get a source medium 16, in which the ground data 12, parts of the ground data 12 and the effective data 14 are stored.

Figure 4:
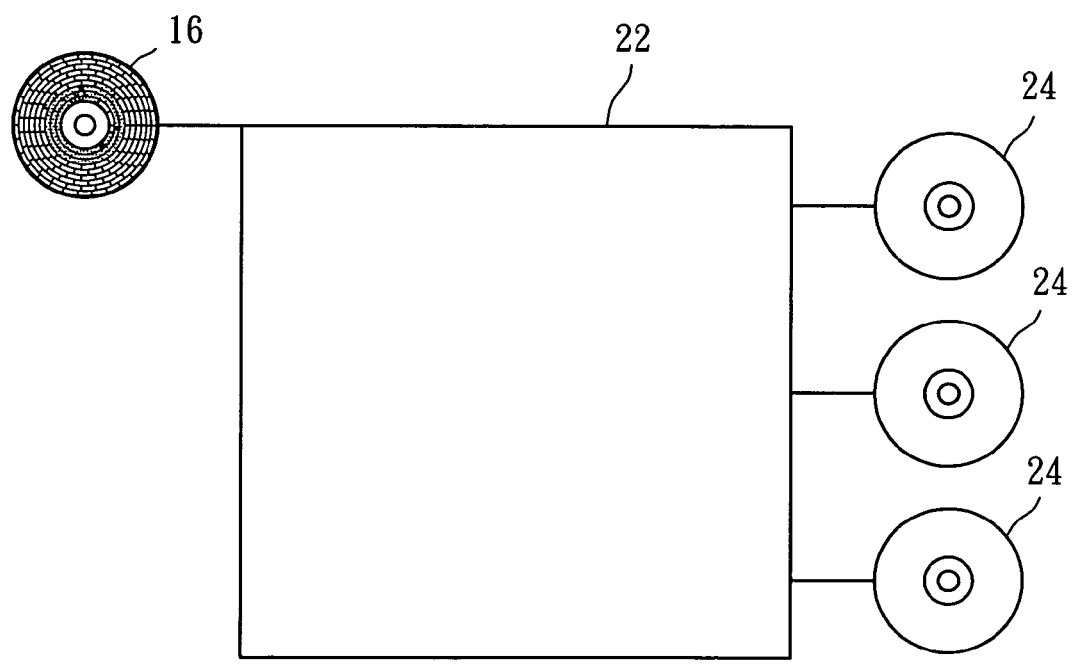
FIG. 4 is a sketch diagram of a duplication system of a preferred embodiment of the present invention.
Figure 5:
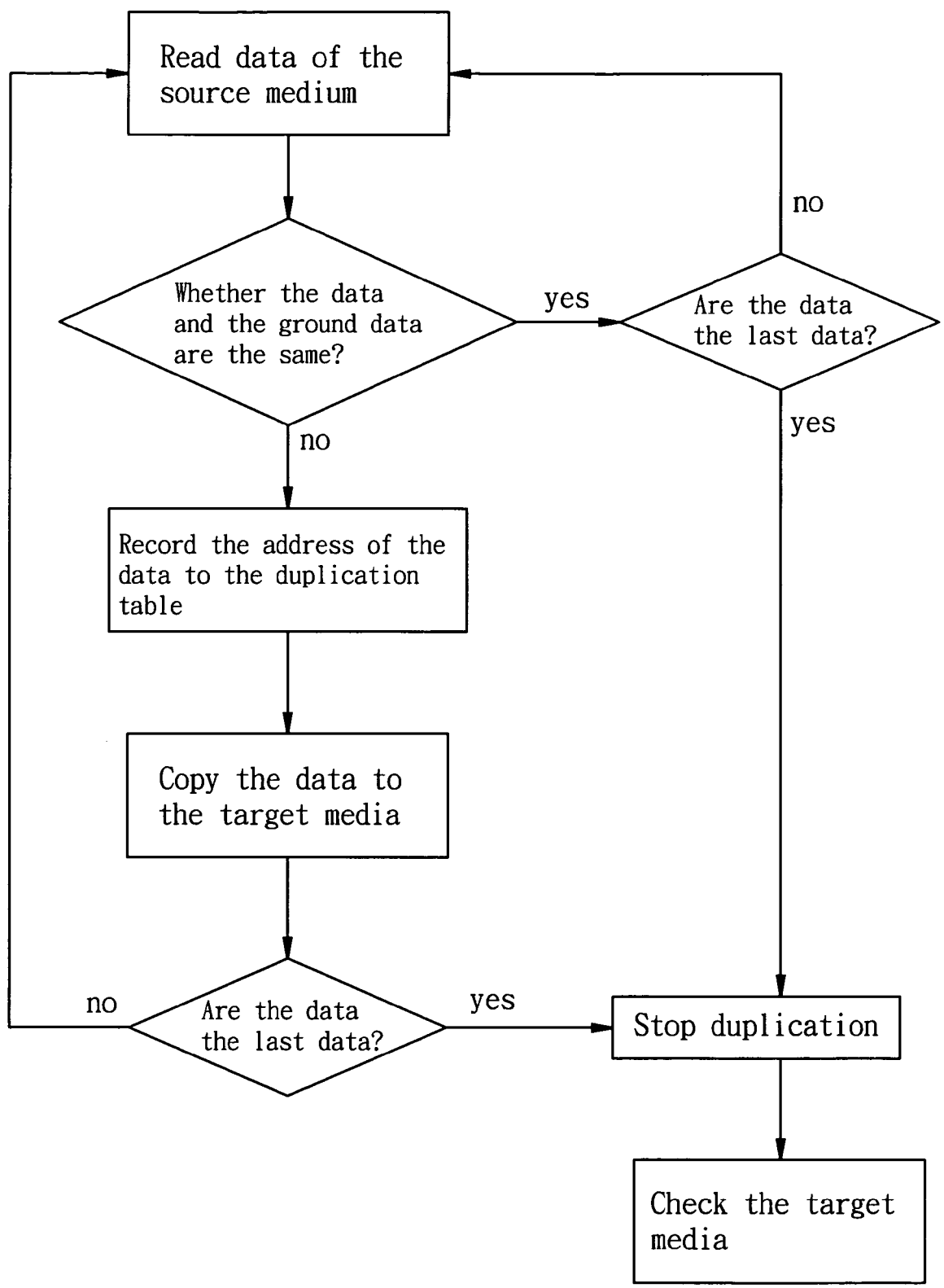
FIG. 5 is a flow chart of the preferred embodiment of the present invention.

Next, we may connect the source medium 16 to a duplicator 20, as shown in FIG. 4. The duplicator 20 is connected with a plurality of target media 24. The duplicator 20 includes CPU, RAM and other relative devices to duplicate data of the source medium 16 to the target media 24.

Reading continuous data of the source medium 16, which size is a sector (as same as the size of the ground datum 12), and comparing it with the ground datum 12. If they are different, it means the read data including the data needed to be duplicated (i.e. the effective data 14), so that the duplicator 20 copies the data to the target media 24 and read next data in the source medium 16. If they are the same, it means that the read data are not the data for duplication (i.e. the ground data 12), the duplicator 20 takes no action to do with the data and reads the next data directly. This step is repeated until all of the data of the source medium 16 are read and compared.

The duplicating method of the present invention may arise error when the effective data 14 have a part of it as same as the ground data 12. We suggest that user has to check the target medium 24 after duplication whether it has the same data as the source medium 16? If do, it means the duplication is successful that user may continue the duplication. If don't, it has to create another ground datum and make a new source medium 16 for the duplication.

Figure 6:
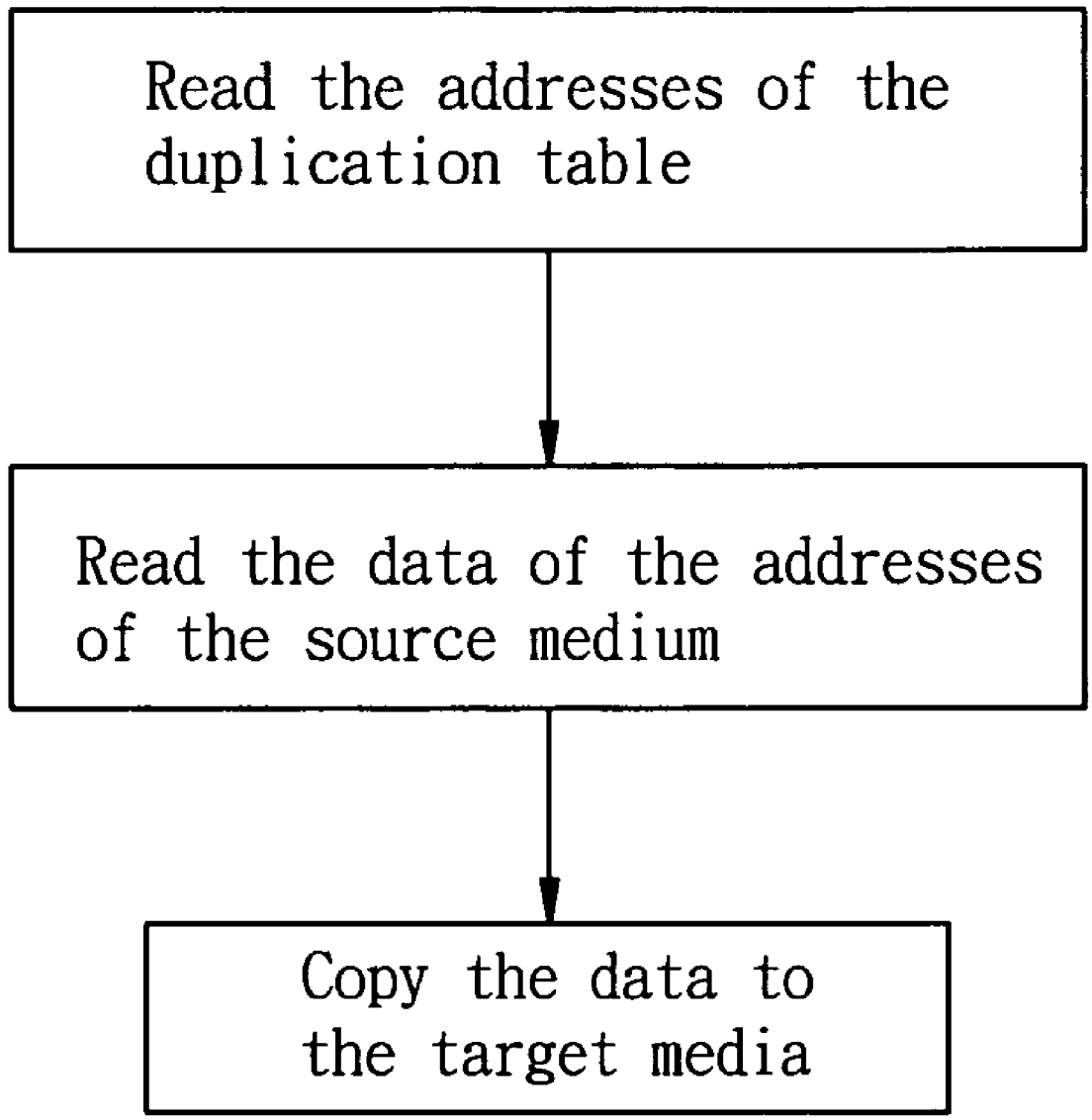
FIG. 6 is a flow chart of the duplication process after the successful duplication.

The duplicator 20 records the addresses of the data in a table when it read the data of the source medium 16 and the data are not as same as the ground data. When we confirm that the duplication is successful, as shown in FIG. 6, the duplicator 20 reads the addresses in the table, and then read the data of the source medium 16 at the corresponding addresses for duplication to the target media 24. In other words, the duplicator 20 has not to compare the data read from the source medium 16 to the ground data 12, instead of reading the data according to the addresses in the table directly for duplication that increases the speed of duplication much.

The duplication according to the method of the present invention may have a part of the ground data 12, which is not the data to be copied, duplicated to the target media 24, but the data will not affect read and write the effective data 14 in the target media 24. It may waste a little time to copy these invalid data, but the total duplication time is shortened because it decreases the movement of the read/write head of the medium.

In conclusion, the duplication method of the present invention copies the data in an order of the sectors of the media rather than file by file. The duplication method of the present invention will not affected by the various file systems that means the duplication method of the present invention works in any file system.

What is claimed is:

1. A method for duplicating data of a source medium to at least one target medium, comprising the steps of:
    a) making the source medium, in which ground data and effective data are stored, wherein a ground datum is repeatedly stored in the source medium, and the effective data, which are data for duplication, overwrite some of the ground data, wherein each of the overwritten ground data is partially or entirely overwritten;
    b) reading data of the source medium, wherein a size of the data is as same as that of the ground data;
    c) comparing the data to the ground data, wherein if the data are not as same as the ground data, then copy the data to the at least one target medium; and if the data are as same as the ground data, then take no duplication; and
    d) reading next data of the source medium and repeating the step c.

2. The method as defined in claim 1, wherein the step of making the source medium includes the steps of:
    1) preparing an empty medium;
    2) writing the ground datum to the medium repeatedly to fill up the medium; and
    3) writing the effective data to the medium to overwrite said some of the ground data.

3. The method as defined in claim 1, wherein the size of the ground datum is in a range of a sector and a plurality of sectors.

4. The method as defined in claim 1, wherein the size of the ground datum is in a range of 512 bytes and 2048 bytes.

5. The method as defined in claim 1, further comprising the step of comparing the target medium to the source medium after duplication to check whether the data of the target medium is as same as that of the source medium or not.

6. The method as defined in claim 5, wherein if the target medium is different to the source medium, then makes a new source medium by creating another ground datum and performs the steps b to d.

7. The method as defined in claim 1, wherein if the data are not as same as the ground data in the step c, the method further comprises the step of recording an address of the data of the source medium in a table.

8. The method as defined in claim 7, further comprising the steps of reading the data of the source medium according to the addresses of the data in the table, and copying the data to the at least one target medium.

* * * * *